United States Patent
Schindler et al.

(10) Patent No.: US 11,726,201 B2
(45) Date of Patent: Aug. 15, 2023

(54) METHOD FOR OPERATING A RADAR SENSOR IN A MOTOR VEHICLE

(71) Applicant: Robert Bosch GmbH, Stuttgart (DE)

(72) Inventors: Daniel Schindler, Ludwigsburg (DE); Gor Hakobyan, Stuttgart (DE); Johannes Fink, Karlsruhe (DE); Kai Penske, Renningen (DE); Michael Schoor, Stuttgart (DE); Armin Himmelstoss, Weissach Im Tal (DE)

(73) Assignee: ROBERT BOSCH GMBH, Stuttgart (DE)

(*) Notice: Subject to any disclaimer, the term of this patent is extended or adjusted under 35 U.S.C. 154(b) by 260 days.

(21) Appl. No.: 17/229,533

(22) Filed: Apr. 13, 2021

(65) Prior Publication Data
US 2021/0405184 A1    Dec. 30, 2021

(30) Foreign Application Priority Data

Jun. 25, 2020   (DE) .......................... 102020207879.3

(51) Int. Cl.
*G01S 13/90*     (2006.01)
*G01S 13/931*    (2020.01)
*G01S 13/58*     (2006.01)

(52) U.S. Cl.
CPC .......... *G01S 13/9029* (2013.01); *G01S 13/58* (2013.01); *G01S 13/9017* (2013.01); *G01S 13/931* (2013.01)

(58) Field of Classification Search
CPC .. G01S 13/9029; G01S 13/58; G01S 13/9017; G01S 13/931; G01S 13/449; G01S 13/52; G01S 13/524; G01S 13/5242; G01S 13/581; G01S 13/60; G01S 13/90; G01S 13/9004; G01S 13/9021; G01S 13/904
USPC ........................................................ 342/25 B
See application file for complete search history.

(56) References Cited

U.S. PATENT DOCUMENTS

| | | | | |
|---|---|---|---|---|
| 4,321,601 A | * | 3/1982 | Richman ............. | G01S 13/9092 342/25 C |
| 5,160,932 A | * | 11/1992 | Bull ..................... | G01S 13/9017 342/25 E |
| 5,497,158 A | * | 3/1996 | Schmid ............... | G01S 13/9027 342/25 F |
| 5,818,383 A | * | 10/1998 | Stockburger ............ | G01S 7/415 342/161 |

(Continued)

FOREIGN PATENT DOCUMENTS

| CA | 2579898 A1 | * | 8/2007 | ......... G01S 13/9023 |
|---|---|---|---|---|
| CA | 2899869 A1 | * | 8/2014 | ............. G01S 13/90 |

(Continued)

*Primary Examiner* — Nuzhat Pervin
(74) *Attorney, Agent, or Firm* — Norton Rose Fulbright US LLP; Gerard Messina

(57) ABSTRACT

A method for operating a radar sensor in a motor vehicle, in which in a SAR measuring mode according to the principle of the synthetic aperture, objects, including stationary objects, are located with high angular resolution. The same radar sensor is operated in time-shifted manner or concurrently in the SAR measuring mode and in a Doppler measuring mode, the relative speeds of objects, including moving objects, being measured with a time resolution in the Doppler measuring mode that is greater than the time resolution in the SAR measuring mode.

19 Claims, 3 Drawing Sheets

(56) References Cited

U.S. PATENT DOCUMENTS

| | | | | |
|---|---|---|---|---|
| 6,204,800 B1* | 3/2001 | Neumann | G01S 13/9019 | 342/25 R |
| 6,400,306 B1* | 6/2002 | Nohara | G01S 13/87 | 342/25 R |
| 6,441,772 B1* | 8/2002 | Hellsten | G01S 13/9017 | 342/25 R |
| 7,965,226 B2* | 6/2011 | Krikorian | G01S 13/22 | 342/131 |
| 8,207,887 B2* | 6/2012 | Goldman | G01S 13/9029 | 342/159 |
| 8,416,123 B1* | 4/2013 | Mitchell | G01S 13/726 | 342/107 |
| 8,427,359 B1* | 4/2013 | Bickel | G01S 13/9029 | 342/25 A |
| 9,746,554 B2* | 8/2017 | Millar | G01S 13/931 | |
| 9,869,763 B2* | 1/2018 | Calabrese | G01S 13/90 | |
| 2005/0057654 A1* | 3/2005 | Byren | G01S 17/90 | 348/169 |
| 2007/0252748 A1* | 11/2007 | Rees | H01Q 13/02 | 342/36 |
| 2008/0106457 A1* | 5/2008 | Bartolini | G01S 13/784 | 342/40 |
| 2010/0321234 A1* | 12/2010 | Goldman | G01S 13/9029 | 342/25 A |
| 2011/0006944 A1* | 1/2011 | Goldman | G01S 13/9054 | 342/25 A |
| 2016/0109570 A1* | 4/2016 | Calabrese | G01S 13/9054 | 342/25 F |
| 2016/0349363 A1* | 12/2016 | Millar | G01S 13/931 | |
| 2020/0393552 A1* | 12/2020 | Fang | G01S 7/003 | |
| 2021/0156982 A1* | 5/2021 | Stettiner | G01S 13/347 | |
| 2021/0158810 A1* | 5/2021 | Tzirkel-Hancock | G10L 15/22 | |

FOREIGN PATENT DOCUMENTS

| | | | | |
|---|---|---|---|---|
| DE | 19735848 A1 * | 10/1998 | | G01S 13/90 |
| DE | 19912370 A1 | 12/1999 | | |
| DE | 69924011 T2 * | 2/2006 | | G01S 13/90 |
| DE | 102006009121 A1 * | 8/2007 | | G01S 13/9023 |
| DE | 102014218092 A1 * | 3/2016 | | G01S 13/34 |
| DE | 102015012812 A1 * | 4/2017 | | G01S 13/87 |
| EP | 3151035 A1 * | 4/2017 | | G01S 13/87 |
| EP | 2954347 B1 * | 4/2018 | | G01S 13/90 |
| WO | WO-2014122624 A1 * | 8/2014 | | G01S 13/90 |
| WO | WO-2021008889 A1 * | 1/2021 | | G01S 13/52 |

* cited by examiner

METHOD FOR OPERATING A RADAR SENSOR IN A MOTOR VEHICLE

CROSS REFERENCE

The present application claims the benefit under 35 U.S.C. § 119 of German Patent Application No. DE 102020207879.3 filed on Jun. 25, 2020, which is expressly incorporated herein by reference in its entirety.

FIELD

The present invention relates to a method for operating a radar sensor in a motor vehicle, in which in a SAR (synthetic aperture radar) measuring mode according to the principle of the synthetic aperture, objects, including stationary objects, are located with high angular resolution.

BACKGROUND INFORMATION

Radar systems for measuring distances, relative speeds and locating angles of objects are used in motor vehicles for various assistance functions, for example, for safety functions such as automatic collision warning or collision avoidance, as well as for convenience functions like an automatic search for parking spaces, for instance. One example for a method for operating a SAR radar sensor in a motor vehicle is described in German Patent Application No. DE 199 12 370 A1.

The principle of the synthetic aperture allows exceptionally accurate angle measurements during self-movement of the radar sensor, by combining the radar measurements at different local positions with each other in such a way that a large antenna aperture is produced synthetically. The synthetic aperture comes about because, due to the self-movement of the vehicle and the radar sensor, the transmitting and receiving antennas are at different positions at the moment of each individual radar measurement. That is why the radar echoes received may be processed as though a large antenna aperture existed along the driving trajectories of the vehicle. As a result, a substantially greater angular-resolution capability is achieved than is possible for an antenna array with a physical aperture that is limited owing to installation conditions.

To evaluate the measured radar signals according to the principle of the synthetic aperture, it is necessary to know the self-movement of the radar sensor, that is, the driving trajectory of the vehicle. This driving trajectory is an input parameter for the SAR evaluation algorithm and represents the basis for calculating a SAR image. Depending on the evaluation algorithm, the exact driving trajectory is measured, or the driving trajectory is estimated on the basis of the measured self-speed of the vehicle, in doing so, a linear course of the trajectory being assumed.

In general, when using the conventional SAR evaluation algorithms, the radar surroundings are assumed to be stationary. However, there are also approaches which expand the SAR evaluation to non-stationary radar surroundings, by making corrections for moderate movements of objects.

The transmit frequencies of the radar sensors lie typically at approximately 24 GHz or 77 GHz. The SAR evaluation is normally independent of the method for frequency modulation used in each instance. In general, the maximum assignable bandwidths for the frequency modulation lie below 4 GHz, mostly more or less on the order of 0.5 GHz.

One modulation method used frequently in radar systems for motor vehicles is FMCW (Frequency Modulated Continuous Wave) modulation with "fast ramps" (fast chirp modulation), in which a plurality of linear frequency ramps with identical slope are passed through one after the other. After low-pass filtering, the mixture of the instantaneous transmit signal with the received signal yields a low-frequency (beat note) signal, whose frequency is proportional to the distance of the located object. As a rule, the system is designed in such a way that in the case of the usual relative speeds of the located objects, the portion of the beat frequency caused by the Doppler effect is negligibly small. Given suitable selection of the parameters, one thus obtains unambiguous distance information. The Doppler shift, and consequently the relative speed, may subsequently be determined by observing the temporal development of the phases of the (complex) distance signals over the plurality of ramps. The distance and speed measurements may be carried out independently of each other, e.g., with the aid of a two-dimensional fast Fourier transform.

The fast-chirp modulation may also be used for a SAR radar sensor. Distance may then be measured in the same way as when using a classic FMCW radar. However, the Doppler evaluation over the frequency ramps is replaced by the SAR evaluation, so that, on the assumption of stationary targets and with knowledge of the self-movement of the vehicle, an angle measurement is obtained as measuring result rather than Doppler measurements.

Various conventional algorithms are available for the SAR evaluation. For applications in the automotive sector, algorithms are preferred which involve certain restrictions with respect to the course of the driving trajectories, but in return permit efficient calculation of SAR images in real time using the data-processing capacity available in a motor vehicle.

Since the angular resolution is dependent on the size of the aperture and therefore the length of the trajectory driven through in a measuring cycle, which for its part, is proportional to the product of driving speed and time, the time resolution in the case of a SAR evaluation with high angular resolution is inevitably limited. That is why SAR radar sensors are used particularly for applications in which the radar surroundings to be sensed exhibit only low dynamics. On the other hand, in order to sense highly dynamic driving situations, radar sensors are employed which are designed for classic measuring principles, and in particular, permit measurement of relative speeds with high time resolution and speed resolution.

SUMMARY

An object of the present invention is to permit use of an easily set-up radar system for a larger range of measuring tasks.

This objective may be achieved according to an example embodiment of the present invention owing to the fact that the same radar sensor is operated in time-shifted manner or concurrently in the SAR measuring mode and in a Doppler measuring mode, the relative speeds of objects, including moving objects, being measured with a time resolution in the Doppler measuring mode that is greater than the time resolution in the SAR measuring mode.

An example embodiment of the present invention thus makes it possible to use one and the same radar sensor both for measuring tasks for which a high angular resolution is demanded, as well as for measuring tasks which involve the sensing of more dynamic situations and which therefore require a higher time resolution, that is, a greater number of repetitions of the measuring operation per unit of time. In this way, with a minimum of hardware costs, namely, already with a single radar sensor, it is possible to increase functionality. At the same time, in comparison to a system with separate radar sensors, the advantage is obtained that interferences between the radar signals are avoided.

Advantageous developments of the present invention are disclosed herein.

In one specific example embodiment of the present invention, the radar sensor may be operated in frequency-division multiplex, so that the signal evaluation may be carried out in the SAR measuring mode and in the Doppler measuring mode at the same time, the measuring signals used for the different evaluation modes being separated from each other based on their frequency. In another specific embodiment, the radar sensor is operated at a given point in time either in the SAR measuring mode or in the Doppler measuring mode, and a switchover is made between the two measuring modes depending on the situation or according to a specific time-division multiplex diagram.

In the SAR mode, the greatest angular resolution is attained for objects which lie transversely to the driving trajectory of the vehicle, thus, have a locating angle on the order of 90° relative to the instantaneous driving direction of the vehicle. On the other hand, for measuring tasks as part of the automatic distance control or the collision warning or avoidance, first and foremost it is a matter of the measuring of distances and relative speeds of objects in front of or behind the ego vehicle, thus, of objects with a locating angle on the order of 0° or 180°. That is why a radar sensor installed in the front of the vehicle preferably is configured by digital beam shaping or by suitable layout of the monostatic or bistatic antenna array in such a way that its locating range covers both the forward direction of the vehicle as well as lateral directions on at least one side of the vehicle. Correspondingly, a radar sensor installed at the rear of the vehicle should cover at least the rearward direction and one side of the vehicle. In this context, the antenna diagram may be configured in such a way that the locating-angle range amounts to 90° or more, and that a greater transmitting power is available in the forward and rearward direction, respectively, so that objects are able to be located at a greater distance there, while laterally alongside the vehicle, often only objects are relevant which have a smaller distance to the ego vehicle.

The switchover between the measuring modes may be carried out depending on the situation. For example, when driving on the highway or autobahn with higher speed, one will more likely use the classic Doppler measuring mode, while when searching for a parking space in urban traffic, a switch will be made to the SAR mode automatically or by driver command in order to recognize and measure parking spaces.

During operation in time-division multiplex, measuring cycles in the SAR mode and measuring cycles in the Doppler mode are interleaved with each other. In so doing, the relative frequency with which the two measuring modes are utilized may in turn vary depending on the situation. For example, when driving on a multilane roadway, in the majority of measuring cycles, the Doppler mode will be used in order, e.g., to carry out an automatic distance control, while measuring cycles in the SAR mode are interposed only occasionally in order to throw a "side glance" at the traffic situation in the adjacent lanes or the stationary traffic, or in order to map the surroundings. On the other hand, when driving at low speed, the proportion of measuring cycles in the SAR mode may be increased.

Since the SAR mode is only usable during travel of the ego vehicle, upon standstill of the vehicle, a switch may be made automatically to the Doppler mode.

In one specific example embodiment of the present invention, a switchover may also be provided between several evaluation algorithms in the SAR measuring mode and/or in the Doppler measuring mode depending on the measuring task, so that the optimal evaluation algorithm may be selected for each measuring task.

In general, the measuring modes are differentiated not only with respect to the evaluation algorithms, but also in terms of the parameters for the hardware of the radar sensor. For example, the transmitting frequencies, the modulation schema, the parameters for the digital beam shaping and other operating parameters may be optimized in view of the evaluation algorithm selected in each case.

In a mixed operation of the measuring modes in time-division multiplex or frequency-division multiplex, it is also possible to fuse the measuring results obtained in the two measuring modes according to a fusion algorithm, particularly with an algorithm that in each case weights the results obtained in the two measuring modes, according to the accuracy or reliability attainable in the measuring modes.

The present invention also includes a radar sensor having analog transmitting and receiving hardware and a digital evaluation system, in which the analog transmitting and receiving hardware as well as the digital evaluation system are configured both for a SAR measuring mode and for a Doppler measuring mode.

Exemplary embodiments of the present invention are explained in greater detail below with the aid of the figures.

DETAILED DESCRIPTION OF EXAMPLE EMBODIMENTS

Figure 1:
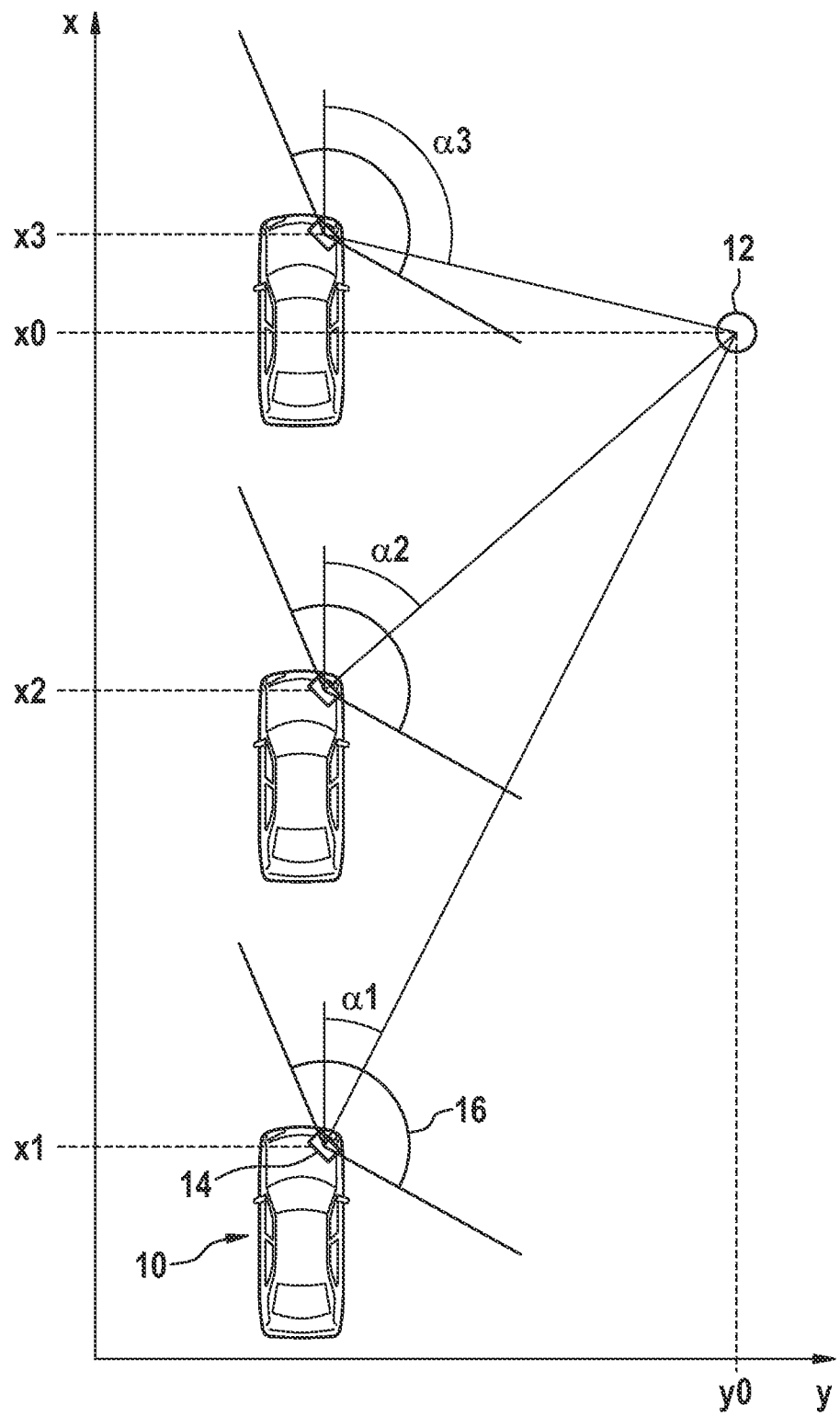
FIGS. 1 to 3 show diagrams to explain a SAR measuring principle.

FIG. 1, in a Cartesian coordinate system having axes x and y, shows a motor vehicle 10, which is traveling with constant speed in the direction of axis x, at three different points in time, at which in each case it occupies a different position x1, x2, x3 along the x axis. A stationary object 12 is located in a coordinate position (x0, y0) laterally alongside the trajectory traveled by vehicle 10. Front right, vehicle 10 has a radar sensor 14, represented only schematically here, whose locating-angle range 16 covers both the area in front of vehicle 10 as well as the area laterally alongside the vehicle in the direction of axis y. (A sensor disposed in mirror-image to it on the other side of the vehicle is not shown here.)

Object 12 is located by radar sensor 14 at each of positions x1, x2, x3 at a different locating angle $\alpha1, \alpha2, \alpha3$. Locating angles $\alpha1$-$\alpha3$ are defined in each case as the angle between the line of sight from radar sensor 14 to object 12 and the forward direction of the vehicle, that is, a parallel to axis x, which goes through the location of radar sensor 14.

As usual, radar sensor 14 features an antenna array having a plurality of antenna elements that are disposed side-by-side in the horizontal and that form a specific physical aperture, so that the locating angle of object 12 may be measured on the basis of the phase and amplitude relations between the two signals reaching antenna elements, even if only with limited angular resolution. However, according to the principle of the synthetic aperture, the radar signals which are received while vehicle 10 is moving along its trajectory from position x1 to position x3 are recorded and offset against each other, so that a synthetic aperture is obtained which corresponds to the distance between x1 and x3 and is larger many times over than the physical aperture of the radar sensor. As a consequence, at least at the end of the measuring cycle, locating angle α3 of object 12 is able to be measured with substantially higher angular resolution. Moreover, the respective distance of object 12 is also measured in known manner by radar sensor 14, so that the coordinate position (x0, y0) of object 12 may be determined with high precision.

For example, this measuring principle is suitable for mapping contours of objects in the vicinity of vehicle 10, such as other vehicles parked on the roadside as well as parking spaces between them, with great accuracy. In the same way, the method may also be used to map objects further afield from the vehicle during travel, or conversely, if the locations of the objects are known from a digital map, to precisely localize the position of ego vehicle 10 based on the measured locating angles.

Figure 2:
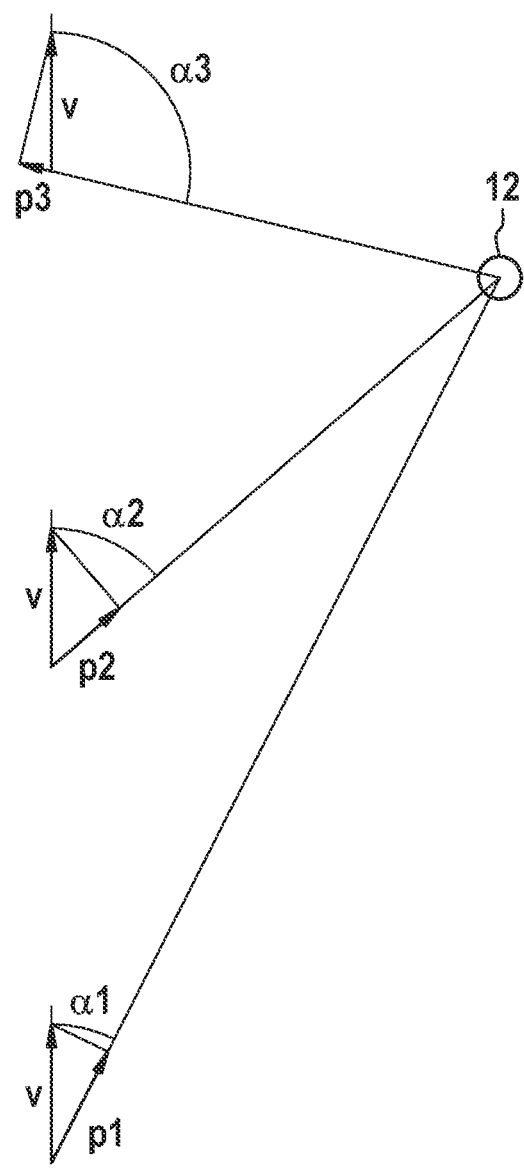
Figure 3:
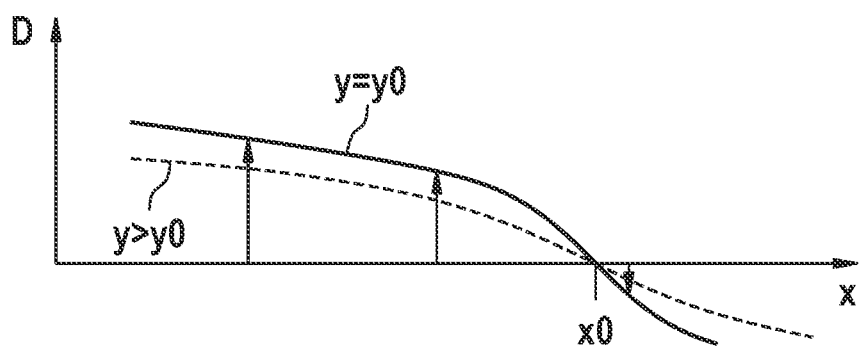

One possible evaluation method shall be explained with the aid of FIGS. 2 and 3.

FIG. 2 shows object 12 as well as locating angles α1, α2 and α3 for each of the three positions x1-x3 of the vehicle. In addition, velocity vector v of vehicle 10 is shown for each position. It is assumed that this velocity vector is constant within the measuring cycle in which the vehicle is moving from x1 to x3. Moreover, for each of the three positions, FIG. 2 shows orthogonal projection p1, p2, p3 of velocity vector v on the line of sight from the vehicle to object 12. In each case, the amount of this projection vector indicates the instantaneous relative speed of object 12. If the object in the direction of the x-axis is still very far away from the vehicle, the relative speed is nearly equal to the vehicle's own speed, but with increasing approach of the vehicle to location x0 of object 12 on the x-axis, the relative speed decreases. At x0 it reaches the value 0 and then becomes negative (the object recedes).

FIG. 3 shows the relative speed or the corresponding Doppler shift D as a function of the location of vehicle 10 on the x-axis. The shape of the curve is a function of the distance of object 12 from the trajectory of vehicle 10 in the direction of the y-axis. If the distance becomes greater, the curve experiences a centric extension along the x-axis with point x0 as the center of enlargement, as indicated in FIG. 3 by a dashed curve.

If radar sensor 14 operates with fast chirp modulation, for each modulation ramp, one obtains by one-dimensional Fourier transform over the duration of the modulation ramp, a value for the instantaneous distance of the object that is virtually independent of the relative speed. A two-dimensional fast Fourier transform of the signals, which one obtains in the successive modulation ramps, furnishes a spectrum in the second dimension that indicates the relative speed. If the integration time is selected to be short enough that the relative speed is practically constant during this time, then for each point in time—and consequently also for each position x of the vehicle along the driving trajectory—one obtains the instantaneous value of the relative speed as represented by projection vectors p1-p3. Location x0 of object 12 may then be determined by comparison with the curves shown in FIG. 3. Thus, for each position of the vehicle on the x-axis, the associated locating angle of the object may then be determined.

If a longer integration time is selected for the Fourier transform in the second dimension, then a spectrum is obtained directly which is representative for the change of the relative speed with time over the entire measuring cycle. Based on this spectrum, location coordinate y0 of the object and consequently the locating angle for each point in time may be determined with particularly great accuracy.

Figure 4:
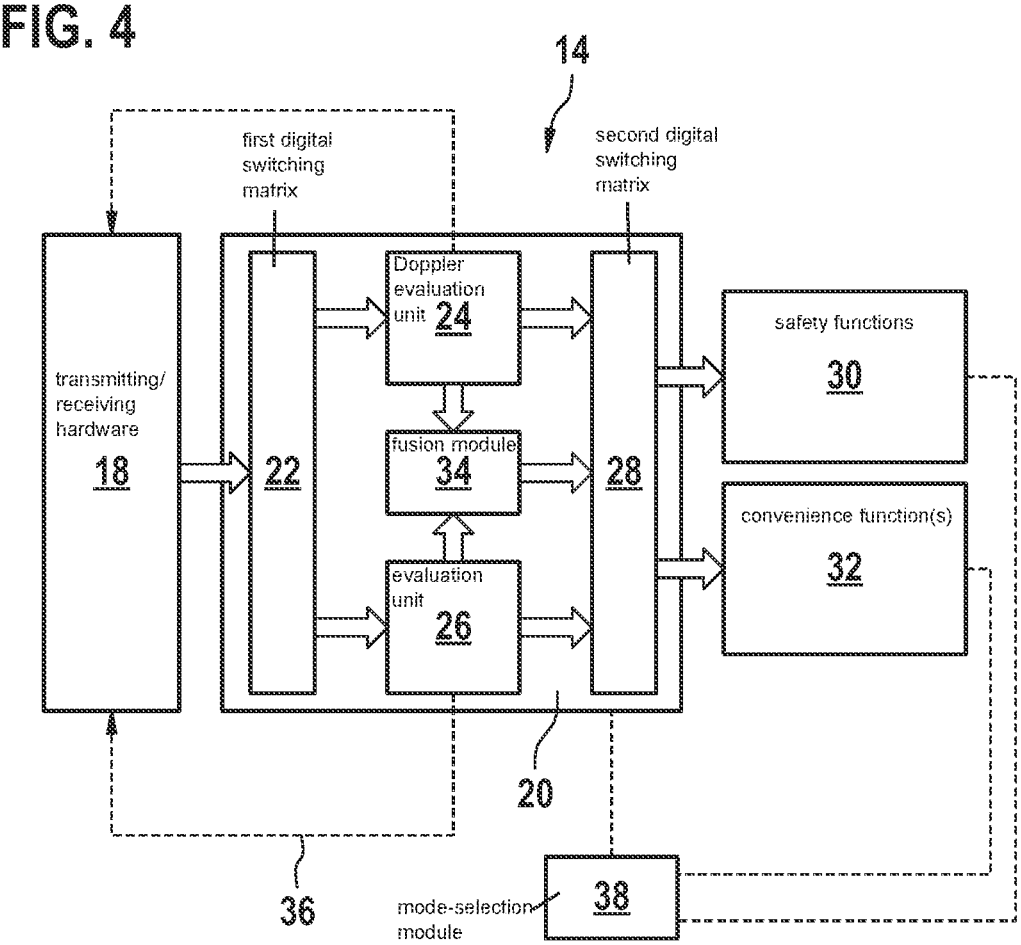
FIG. 4 shows a block diagram of a radar sensor which is configured for the method according to an example embodiment of the present invention

FIG. 4 shows main components of radar sensor 14 in a block diagram. As usual, the radar sensor has analog transmitting and receiving hardware 18, typically in the form of a board suitable for high frequency, on which a plurality of antenna patches, a local oscillator for generating the frequency-modulated transmit signals as well as mixers for mixing the received signals with the instantaneous transmit signal are disposed. The received signals, received in the various receive channels (antenna patches) and mixed down into the beat-frequency band, are transmitted as time signals via an analog-to-digital converter to a digital arithmetic logic unit 20.

Depending on the operating mode of the radar sensor, the digitized time signals are transmitted by a first digital switching matrix 22 either to a classic Doppler evaluation unit 24 or to a SAR evaluation unit 26. In Doppler evaluation unit 24, the digitized complex amplitudes of the received signals are recorded over the duration of one measuring cycle that includes a plurality of successive frequency ramps (chirps). By two-dimensional Fourier transform, a two-dimensional spectrum is formed which in one dimension, indicates the distances of the located objects, and in the other dimension, indicates the relative speeds. Each object stands out clearly in this spectrum owing to a peak at a determined distance and a determined relative speed. The signals of each individual antenna patch are evaluated in a separate receive channel and transformed into a corresponding spectrum. By comparing the complex amplitudes obtained in the various spectra for the same object (the same peak), the locating angle of the object is then determined with a certain accuracy by angle estimation. The locating data thus obtained are then transferred via a second digital switching matrix 28 to various downstream assistance functions, for example, to safety functions 30 such as an emergency braking function, an adaptive cruise control or the like, and/or to one or more convenience functions 32 such as mapping, parking-space search and the like.

In SAR evaluation unit 26, the digitized received signals are likewise recorded over a specific measuring cycle and subjected to a two-dimensional fast Fourier transform. For each located object, the spectrum thus obtained also furnishes the associated object distance in one dimension. In the other dimension, however, the spectrum is not evaluated in terms of the relative speeds, but rather with respect to the dependence of the relative speeds on the locating angle illustrated in FIG. 3, on the assumption that the located objects are stationary (which may be verified based on the characteristic change of the object distance), and on the assumption that vehicle 10 is moving with constant and known speed on a linear trajectory during the duration of the measuring cycle. Depending on available computing capacity, this evaluation may be carried out simultaneously for several receive channels or only for a single receive channel. As a result of the evaluation in SAR evaluation unit 26, one in turn obtains the distance data of the objects as well as high-resolution angle data or, equivalent to that, location coordinates (x, y) of each object, but generally no relative-speed data, or at least no relative-speed data with high time resolution. These data are also transferred via digital switching matrix 28 to safety functions 30 and/or convenience functions 32.

In addition, in the example shown, arithmetic logic unit 20 includes a fusion module 34, in which optionally the locating data received from evaluation units 24 and 26 are fused together, in each case weighted according to the quality of the data obtained by the different evaluation methods. The fused results are also passed on via the second digital switching matrix to safety functions 30 and convenience functions 32. Moreover, evaluation units 24 and 26 determine the operating parameters for transmitting and receiving hardware 18 that are optimal for the specific evaluation algorithm, and supply corresponding control signals 36 to this hardware, so that the operating parameters are adapted to the specific measuring mode.

In addition, radar sensor 14 has a mode-selection module 38 which may be integrated into arithmetic logic unit 20, but is shown here as a separate block for reasons of clarity. This mode-selection module 38 receives request signals from safety functions 30 and convenience functions 32, gives these request signals a higher or lower priority depending on the traffic situation (or according to the driver input) and determines the instantaneous operating mode of the radar sensor based on these priorities. For example, if one of safety functions 30 detects a critical traffic situation in which there is danger of a collision, then the data needed by an emergency-braking function, thus, particularly high-resolution distance and speed data, receive the highest priority, and the arithmetic logic unit operates in a mode in which Doppler evaluation unit 24 is predominantly or exclusively active.

Figure 5:
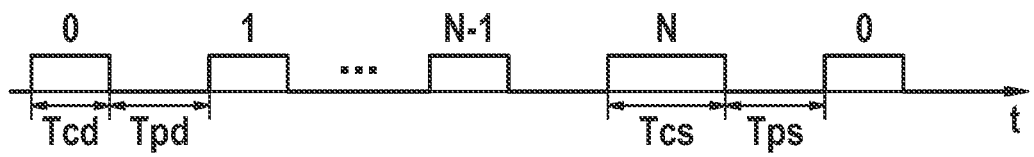
FIG. 5 shows a time diagram for a method according to an example embodiment of the present invention.

FIG. 5 illustrates, in the form of a time diagram, a method for operating radar sensor 14 according to FIG. 4, in which Doppler evaluation unit 24 and SAR evaluation unit 26 operate in time-division multiplex. One time-division multiplex period includes a certain number N of consecutive measuring cycles, which are numbered continuously from 0 to N in FIG. 5. Measuring cycles 0 to N−1 are Doppler measuring cycles, each of which has a duration Tcd within which the received signals are recorded. The individual Doppler measuring cycles are separated in each case by a processing time Tpd, within which the data recorded during the previous measuring cycle are evaluated in Doppler evaluation unit 24.

Last Doppler measuring cycle N−1 is followed—again after a processing time of the length Tpd—by cycle N, which is a SAR measuring cycle and which in the example shown, has a longer duration Tcs than the Doppler measuring cycles. After a processing time Tps in which the measurement data are evaluated by SAR evaluation unit 26, SAR measuring cycle N is then followed by first Doppler measuring cycle "0" of the next multiplex period.

If mode-selection module 38 determines that the convenience functions require a higher priority, e.g., because the driver of vehicle 10 is looking for a parking space, then the multiplex diagram is altered by reducing the number of Doppler measuring cycles per multiplex period, so that the relative number of SAR measuring cycles increases. In the extreme case, the Doppler measuring cycles may be discontinued entirely for the duration of the parking-space search.

What is claimed is:

1. A method for operating a radar sensor in a motor vehicle, in which in a synthetic aperture radar (SAR) measuring mode according to the principle of synthetic aperture, objects, including stationary objects, are located with high angular resolution, the method comprising the following steps:
operating the same radar sensor in time-shifted manner or concurrently in the SAR measuring mode and in a Doppler measuring mode; and
measuring relative speeds of objects, including moving objects, with a time resolution in the Doppler measuring mode that is greater than a time resolution in the SAR measuring mode; and
at least one of the following steps (a)-(b):
(a) fusing together respective measuring results quantifying a same measured parameter, which are obtained in the SAR measuring mode and in the Doppler measuring mode, by a combination that differently weights the respective results according to a predefinition of respective qualities attainable by the respective ones of the measuring modes with respect to the measured parameter; and
(b) based on at least one of a determined current speed of the motor vehicle and a determined type of road currently traveled by the motor vehicle, one of:
(i) switching from one of the measuring modes to the other of the measuring modes; and
(ii) selecting relative frequencies at which the radar sensor is operated for performing measuring cycles in the Doppler measuring mode and at which the radar sensor is operated for performing measuring cycles in the SAR measuring mode, so that for a single period of a length of time, respective proportions of the period which are set to be allocated to each of the measuring modes varies depending on the at least one of the determined current speed and the determined type of road currently traveled.

2. The method as recited in claim 1, wherein the method includes the step of, based on at least one of the determined current speed of the motor vehicle and the determined type of road currently traveled by the motor vehicle, switching from one of the measuring modes to the other of the measuring modes.

3. The method as recited claim 1, wherein sequences of measuring cycles in the Doppler measuring mode and sequences of measuring cycles in the SAR measuring cycle are interleaved with each other according to a multiplex diagram.

4. The method as recited in claim 1, wherein the method includes the step of, based on the at least one of the determined current speed of the motor vehicle and the determined type of road currently traveled by the motor vehicle, selecting the relative frequencies at which the radar sensor is operated for performing measuring cycles in the Doppler measuring mode and at which the radar sensor is operated for performing measuring cycles in the SAR measuring mode, so that for the single period of the length of time, the respective proportions of the period which are set to be allocated to each of the measuring modes varies depending on the at least one of the determined current speed and the determined type of road currently traveled.

5. The method as recited in claim 1, wherein operating parameters of analog transmitting and receiving hardware of the radar sensor, including at least one of frequencies of transmitted signals, a modulation scheme, and a digital beam shaping parameter, are adapted dynamically to a measuring mode to be utilized in each case.

6. A radar sensor, comprising:
analog transmitting and receiving hardware; and a digital arithmetic logic unit;
wherein:
the transmitting and receiving hardware and the arithmetic logic unit are configured to operate the radar sensor in time-shifted manner or concurrently in a synthetic aperture radar (SAR) measuring mode and in a Doppler measuring mode; and
the digital arithmetic logic unit is configured to performed at least one of the following steps (a)-(b):
(a) fuse together respective measuring results quantifying a same measured parameter, which are obtained in the SAR measuring mode and in the Doppler measuring mode, by a combination that differently weights the respective results according to a predefinition of respective qualities attainable by the respective ones of the measuring modes with respect to the measured parameter; and
(b) based on at least one of a determined current speed of the motor vehicle and a determined type of road currently traveled by the motor vehicle, one of:
(i) switch from one of the measuring modes to the other of the measuring modes; and
(ii) select relative frequencies at which the radar sensor is operated for performing measuring cycles in the Doppler measuring mode and at which the radar sensor is operated for performing measuring cycles in the SAR measuring mode, so that for a single period of a length of time, respective proportions of the period which are set to be allocated to each of the measuring modes varies depending on the at least one of the determined current speed and the determined type of road currently traveled.

7. The radar sensor as recited in claim 6, wherein the radar sensor has a locating-angle range that extends over at least 90°.

8. A motor vehicle, comprising:
a radar sensor that includes analog transmitting and receiving hardware and a digital arithmetic logic unit;
wherein:
the transmitting and receiving hardware and the arithmetic logic unit are configured to operate the radar sensor in a time-shifted manner or concurrently, in a synthetic aperture radar (SAR) measuring mode and in a Doppler measuring mode;
the radar sensor is installed in the vehicle in such a way that a locating-angle range of the radar sensor covers at least a forward direction of the vehicle as well as an area laterally alongside the vehicle on at least one side of the vehicle; and
the digital arithmetic logic unit is configured to performed at least one of the following steps (a)-(b):
(a) fuse together respective measuring results quantifying a same measured parameter, which are obtained in the SAR measuring mode and in the Doppler measuring mode, by a combination that differently weights the respective results according to a predefinition of respective qualities attainable by the respective ones of the measuring modes with respect to the measured parameter; and (b) based on at least one of a determined current speed of the motor vehicle and a determined type of road currently traveled by the motor vehicle:
(i) switch from one of the measuring modes to the other of the measuring modes; and
(ii) select relative frequencies at which the radar sensor is operated for performing measuring cycles in the Doppler measuring mode and at which the radar sensor is operated for performing measuring cycles in the SAR measuring mode, so that for a single period of a length of time, respective proportions of the period which are set to be allocated to each of the measuring modes varies depending on the at least one of the determined current speed and the determined type of road currently traveled.

9. The method as recited in claim 1, wherein the method includes the step of fusing together the respective measuring results quantifying the same measured parameter, which are obtained in the SAR measuring mode and in the Doppler measuring mode, by the combination that differently weights the respective results according to the predefinition of the respective qualities attainable by the respective ones of the measuring modes with respect to the measured parameter.

10. The method as recited in claim 9, wherein the measured parameter is a relative angle, the respective result of the SAR measuring mode quantifying the relative angle being weighted higher in the fusion than the respective result of the Doppler measuring mode quantifying the relative angle.

11. The method as recited in claim 9, wherein the measured parameter is a relative speed, the respective result of the SAR measuring mode quantifying the relative angle being weighted lower in the fusion than the respective result of the Doppler measuring mode quantifying the relative angle.

12. The method as recited in claim 5, wherein the dynamically adapted operating parameters include the frequencies of the transmitted signals.

13. The method as recited in claim 5, wherein the dynamically adapted operating parameters include the modulation scheme.

14. The method as recited in claim 5, wherein the dynamically adapted operating parameters include the digital beam shaping parameter.

15. The method as recited in claim 1, wherein signals of the Doppler measuring mode and signals of the SAR measuring mode are transmitted by the radar sensor simultaneously by an assignment of different respective frequency ranges to the Doppler measuring mode than to the SAR measuring mode.

16. The method as recited in claim 2, wherein the switching is based on the determined current speed.

17. The method as recited in claim 2, wherein the switching is based on the determined type of road currently traveled.

18. The method as recited in claim 4, wherein the selecting is based on the determined current speed.

19. The method as recited in claim 4, wherein the selecting is based on the determined type of road currently traveled.

* * * * *